G. B. MASSEY.
Car Wheel.
No. 65,925. Patented June 18, 1867.
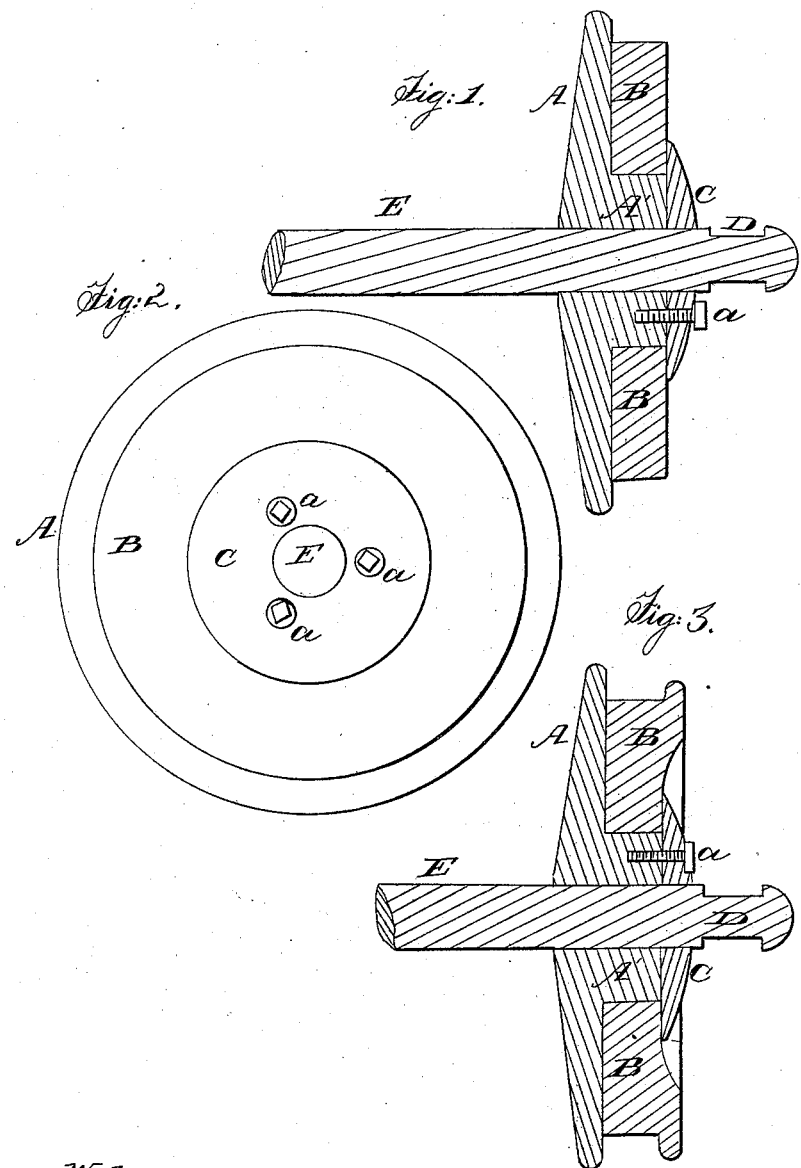
Witnesses
P. T. Dodge
H. B. Munn
Inventor
G. B. Massey
By W. C. Dodge
Atty

United States Patent Office.

G. B. MASSEY, OF NEW YORK, N. Y.

Letters Patent No. 65,925, dated June 18, 1867.

---

IMPROVED CAR-WHEEL.

---

*The Schedule referred to in these Letters Patent and making part of the same.*

---

TO ALL WHOM IT MAY CONCERN:

Be it known that I, G. B. MASSEY, of New York, in the county of New York, and State of New York, have invented certain new and useful improvements in Car-Wheels; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in constructing car-wheels of two parts, one of which is attached rigidly to the axle while the other portion is at liberty to turn loosely, and independent of the first part, in rounding curves.

Figure 1 is a longitudinal vertical section of a portion of the axle and wheel.

Figure 2 is a side elevation of the wheel.

Figure 3, a vertical section, showing a modification of the wheel.

Where both wheels are attached rigidly to the axle, in the usual manner, it is obvious that in passing around curves, the wheel on the outer rail of the curve must travel further than that on the inner rail, and as both wheels are rigidly fixed to the axle, and therefore cannot turn independent of each other, one or the other must slide more or less on the rail. This produces an immense tortional strain on the axle, besides the great wear of the rails and the wheels, and also adds to the power required to move the train. Many plans have been devised to remedy these difficulties, one of the most common of which is to have one of the wheels turn loosely on the axle, while the other is attached rigidly thereto. To this plan there are several serious objections in practice. It is found that wheels thus arranged are apt to move laterally on the axle, and thus become more liable to run off the track. A still more serious difficulty arises from the fact that if the flange of one wheel chances to strike an obstruction, it ceases to revolve, while the opposite wheel continues to roll; and the first wheel being stopped while the other continues its motion, it follows that the latter wheel will immediately leave the rail and travel in a circle around the first, the first thus acting as a pivot or centre around which the axle and loose or outer wheel will move to a greater or less extent. By this means the truck will be thrown more or less crosswise of the track, thereby causing much damage. My invention is intended to obviate these difficulties.

I construct my improved wheel of a disk, A, having a strong hub, A', which is secured rigidly to the axle, the same as the ordinary wheel, as shown in figs. 1 and 3. Upon this hub A', which is turned off true on its periphery, I then place a solid disk or ring, B, and secure it there by a plate, C, bolted securely to the hub, or inner portion of the wheel. This disk B being less in diameter than the portion A, permits the latter to project radially all around beyond the periphery of B; this projecting portion of A thereby forming the flange of the wheel, while the periphery of B constitutes the face or "tread" of the wheel. It will thus be seen that while the wheels A are attached rigidly to the axles at each end, and must therefore both turn together with the axle, the "tread" or disk B may turn independently of either, and thus prevent all slipping on the rail, and all tortional strain on the axle in passing around curves. In running on the ordinary straight track, the parts A and B will both roll together, the same as a solid wheel; as the diameter of the hub A', being so much greater than that of the journal D, there will be no tendency of the "tread" B to turn on the hub A', except when extra force is applied to produce that result, as is the case in turning a curve. I also propose to form a flange, e, on the outer edge of the "tread" or disk B, as shown in fig. 3. By this means, in case the wheel at one side of the car, should, by an obstruction or otherwise, be lifted from the rail, the other wheel will be kept on the rail; so that when the wheel that has been raised shall again strike the track, it will resume its correct position on the rail, and the car be thus kept on the track.

The adoption of this latter form of wheel with the double flange will necessitate slight alterations in the construction of frogs and switches; but this is a matter of minor importance compared with the increased safety afforded to life and property. It is obvious that with a wheel constructed in this manner, the "tread" or disk B may be made of steel, while the portion A may be made of cast iron, and thus rendered far more durable, as it is on the former, principally, that the wear comes. When worn, the tread B may be readily removed, and a new one substituted without detaching the part A from the axle. The hub A' may be made of greater or less diameter, as experience shall decide best, and it will doubtless be found expedient to extend the bolts $a$ entirely through the part A and secure them by nuts.

Having thus described my invention, what I claim, is—

1. A car-wheel, composed of the disk A, having the solid hub A', with the disk B, fitted to turn loosely on the hub, and held thereon by the cap C, as set forth.

2. The car-wheel, consisting of the disk B, provided with the flange $e$, in combination with the disk A, having the solid hub A', said disks A and B being held together by means of the cap C, substantially as described.

G. B. MASSEY.

Witnesses:
W. C. DODGE,
H. B. MUNN.